United States Patent [19]

Schlotter et al.

[11] Patent Number: 4,559,447
[45] Date of Patent: Dec. 17, 1985

[54] TRANSLATION/ROTATION POSITIONING DEVICE

[75] Inventors: Nicholas E. Schlotter, Stanford; John F. Rabolt, San Jose, both of Calif.

[73] Assignee: International Business Machines Corporation, Armonk, N.Y.

[21] Appl. No.: 495,014

[22] Filed: May 16, 1983

[51] Int. Cl.$^4$ .............................. G01D 5/34
[52] U.S. Cl. ...................... 250/231 SE; 356/244
[58] Field of Search ............. 356/304, 310, 244, 366, 356/367; 250/231 SE, 237 G, 225, 360; 340/347 P; 378/15, 20, 79, 80, 208

[56] References Cited

U.S. PATENT DOCUMENTS 3,525,094 8/1970 Leonard ............... 250/231 SE
3,812,351 5/1974 Coberley ............... 250/231
4,183,014 1/1980 McClean et al. ........... 340/204

OTHER PUBLICATIONS

"Rotation of Micro Samples for Infrared Spectrophotomer Analysis", by Kubik, Western Elec. Tech. Dig., No. 3, Jul. 1966, pp. 21, 22.

Primary Examiner—David C. Nelms
Attorney, Agent, or Firm—Joseph E. Kieninger

[57] ABSTRACT

This is a device that enables one to control the translation and rotation of an element relative to a light beam. The device has a rotatable member having a plurality of position-identifying circumferentially spaced openings therein as well as an aperture for the transmission of a light beam. The rotatable member is associated with translation means and rotating means. In a preferred embodiment the rotatable member is remotely controlled with a computer.

5 Claims, 3 Drawing Figures ional positioning feature in combination with the rotational positioning feature. In addition, neither do they have the capability of transmitting or reflecting light.

TRANSLATION/ROTATION POSITIONING DEVICE

DESCRIPTION

1. Technical Field

This invention relates to a translation/rotation positioning device and more particularly such a device that interacts with a transmitted or reflected light beam.

2. Background Art

In certain applications it is desirable to rotate as well as translate certain elements by remote control. For example, utilizing a spectrometer in a vacuum, one would like to rotate the polarizing element in the beam as well as translating the polarizer out of the beam without breaking or losing the vacuum. At the present time there are no known devices which permit one to accomplish these two steps without breaking the vacuum.

The patent to Coberly, U.S. Pat. No. 3,812,351, describes a rotational positioning means. The patent to McClean et al, U.S. Pat. No. 4,283,014, describes a rotational positioning means and an optical reader. However, neither of these two patents has the translational positioning feature in combination with the rotational positioning feature. In addition, neither do they have the capability of transmitting or reflecting light.

SUMMARY OF THE INVENTION

It is a primary object of this invention to provide an improved device that permits both the rotation and translation of elements.

It is another object of this invention to provide a translation/rotation positioning device that moves an element relative to a beam of light.

It is still another object of this invention to provide a translation/rotation positioning device that can be remotely controlled.

These and other objects are accomplished with a device to control the translation and rotation of an element relative to a light beam. The device has a rotatable member having a plurality of positions identifying circumferentially spaced openings therein as well as an aperture for the transmission of a light beam. The circumferentially spaced openings may include a series of slots to tell the absolute stopping position of the member and a series of coded holes to identify each slot. An optical member associated with the slots and holes is used to read the coded holes. The rotatable member is associated with translation means and rotating means. In a preferred embodiment the rotatable member may be remotely controlled with a computer. In this case the desired position is entered into the computer. The signal from the optical reader is compared to the position in the computer and the decision is made whether to continue to rotate to a new position or to remain at the present position.

Other objects of this invention will be apparent from the following detailed description, reference being made to the following drawings in which specific embodiments of the invention are shown.

DESCRIPTION OF THE PREFERRED EMBODIMENT

Figures 1, 2A, 2B:
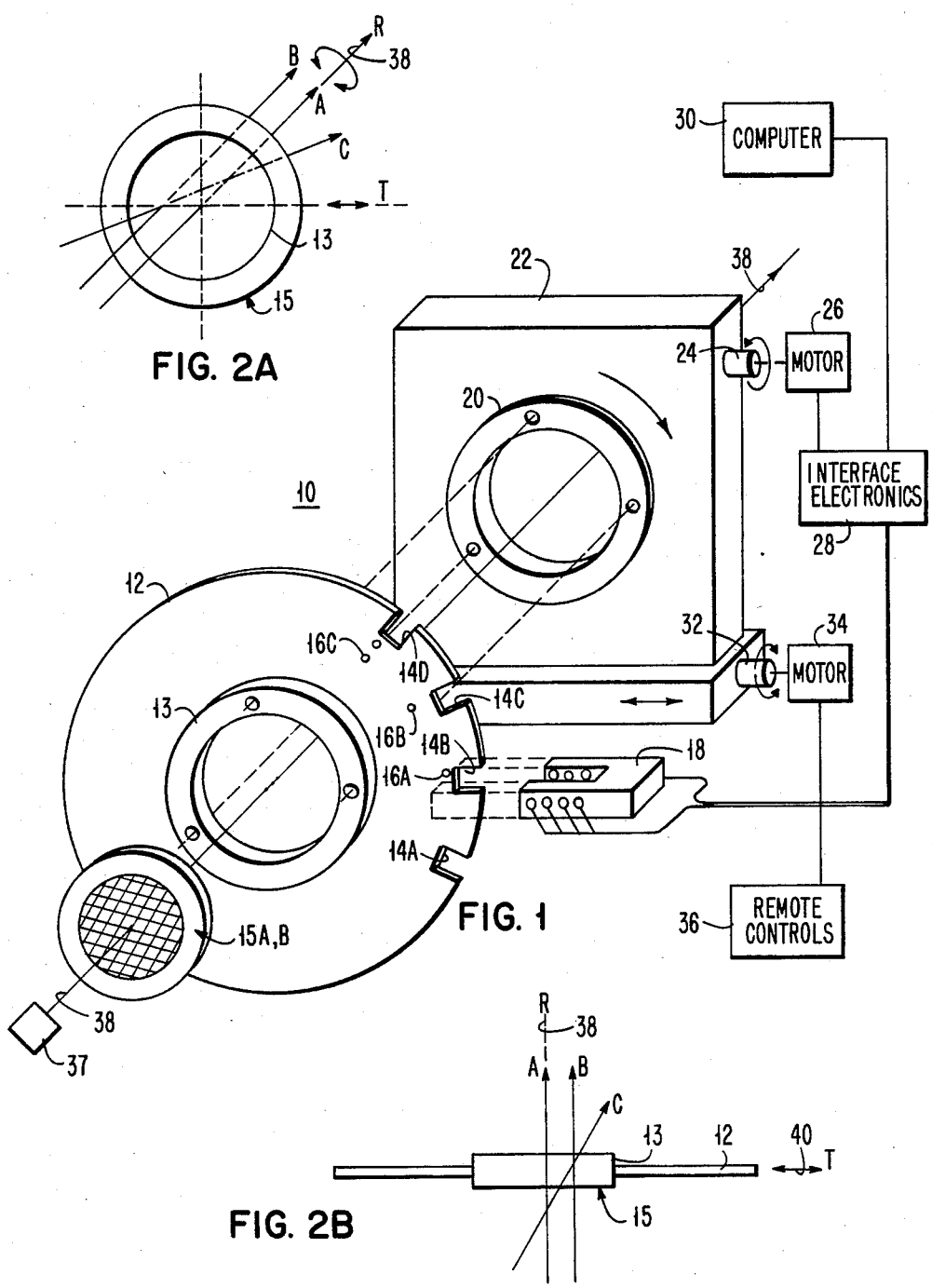
FIG. 1 is an exploded schematic view of a device in accordance with this invention.
FIGS. 2A and 2B are front view and top view sketches of the light beam relative to the axis of rotation of the device.

The device 10 to control the translation and rotation of an element relative to a light beam is shown in FIG. 1. The device 10 has a rotatable member 12 which has a plurality of position identifying circumferentially spaced openings therein. The member 12 has openings in the form of slots 14A, B, C, D etc. which tell the absolute stopping position of the member 12. In FIG. 1, four slots are shown, however, it is understood that any number of slots may be employed and, for example, a preferred number is 16 slots. The member 12 also has a series of encoding holes 16A, B and C that are positioned next to the slots 14B, C and D respectively. Although encoding holes are shown for only three slots, it is understood that each slot 14 would have encoding holes adjacent thereto.

The encoding holes 16 identify each slot. An optical member 18 associated with the holes 16 uses a light source (not shown) to read the coded holes. Member 18 contains individual lights in the form of Light Emitting Diodes on one side and detectors on the other side. An example of the coding utilizing the slots 14 and the holes 16 is shown in the tabulation set forth in the following table.

|  | Holes (16) Binary Encoding | | | | |
| Slot (14) | 1 | 2 | 3 | 4 | |
| --- | --- | --- | --- | --- | --- |
| 1 14A | — | — | — | — | 0000 |
| 2 14B | — | — | — | on | 0001 |
| 3 14C | — | — | on | — | 0010 |
| 4 14D | — | — | on | on | 0011 |
| 5 14E | — | on | — | — | 0100 |
| 6 14F | — | on | — | on | 0101 |
| 7 14G | — | on | on | — | 0110 |
| 8 14H | — | on | on | on | 0111 |
| 9 14I | on | — | — | — | 1000 |
| 10 14J | on | — | — | on | 1001 |
| 11 14K | on | — | on | — | 1010 |
| 12 14L | on | — | on | on | 1011 |
| 13 14M | on | on | — | — | 1100 |
| 14 14N | on | on | — | on | 1101 |
| 15 14O | on | on | on | — | 1110 |
| 16 14P | on | on | on | on | 1111 |

This is a possible method of encoding the rotation locations. In this table the holes can be located at four possible positions. Light visible through a hole gives an "on" indication. These patterns of "on" and "off" are unique and positively identify the location.

The rotatable member 12 has an aperture 13 for the transmission of a light beam. Positioned in the aperture 13 is either an optical element 15A for example, an infrared polarizer, or a sample 15B such as a silicon wafer.

The device 10 has a continuous rotation stage element 20 that has the rotatable member 12 attached thereto. The rotation stage element 20 is in a housing 22 and is connected to a rotatable shaft 24 which is driven by a motor 26 that is connected to an interface electronics box 28 and to a computer 30. The housing 22 is connected to a translatable drive shaft 32 that is driven by motor drive 34 which is controlled by remote controls 36. The housing 22 is moved laterally by the drive shaft 32 while the rotation stage element 20 is rotated by the drive shaft 24.

By the use of the remote controls 36 which activate motor drive 34 and the translation shaft 32, the polarizer 15A or the sample 15B in the aperture 13 can be placed into and withdrawn from an infrared beam when desired. In addition, a matrix of points can be sampled spectroscopically along the circumferences at various radii of the wafer 15B. This is done by combining the translation and rotational capabilities of the device 10.

The beam of light from source 47 passes through the optical filter 15A or the sample 15B located in aperture 13 is shown in FIG. 1 to pass through the rotation axis 38. It is not necessary that the beam direction be parallel to the axis of rotation 38 and centered on it. As shown in FIGS. 2A and 2B the axis of rotation 38 is perpendicular to the translation axis 40 as shown in FIG. 2B. Three beam directions A, B and C are shown in relation to the optical element 15 and the rotatable member 12. As shown in the top view FIG. 2B, three beams A, B and C having different directions pass through the optical element 15. Beam A has a direction which is parallel to the rotation axis 38 and centered thereon. Beam B has a direction parallel to the rotation axis 38 but offset from rotation axis 38. Beam C has a direction that is at an angle to the rotation axis as well as being offset from the center of the aperture 13. Beam C could be centered at the center of the aperture.

FIG. 2A is a front view which is a three-dimensional view where R, the rotation axis 38 is projecting out the back of the paper. Beams A, B and C are described as before earlier in FIG. 2B.

This device 10 allows the rotation of an infrared polarizer inside an evacuated spectrometer to 16 different positions. It is easily controlled by a remotely located keyboard and computer. It uses existing software and can be programmed to place the polarizer at two mutually perpendicular positions, that is 0° and 90° in the infrared beam. When this device 10 is fitted with the sample 15B in place of the polarizer 15A and a matrix of points can be sampled spectroscopically along circumferences at various radii. This is done by combining the translation and rotation capabilities of the device 10.

Although a preferred embodiment has been described, it is understood that numerous variations may be made in accordance with the principles of this invention.

We claim:

1. A translation/rotation positioning device comprising
    a rotatable member with a rotation axis and having a plurality of position identifying circumferentially spaced openings therein, said member having an aperture for the transmission of a light beam,
    means alignable with said openings for optically reading the presence or absence of openings,
    means for rotating the member to discrete positions, and
    means concurrently operable for moving the member translationally in a direction at right angles to the axis of rotation of said member.

2. A device as described in claim 1 including an optical element positioned in said aperture.

3. A device as described in claim 1 including a sample positioned in said aperture.

4. A device as described in claim 1 wherein said circumferentially spaced openings include holes.

5. A device as described in claim 1 wherein said circumferentially spaced openings include slots.

* * * * *